United States Patent [19]
Rivest

[11] Patent Number: 5,724,428
[45] Date of Patent: Mar. 3, 1998

[54] BLOCK ENCRYPTION ALGORITHM WITH DATA-DEPENDENT ROTATIONS

[75] Inventor: Ronald L. Rivest, Arlington, Mass.

[73] Assignee: RSA Data Security, Inc., Redwood City, Calif.

[21] Appl. No.: 548,318

[22] Filed: Nov. 1, 1995

[51] Int. Cl.$^6$ .................................................. H04L 9/06
[52] U.S. Cl. ............................ 380/37; 380/28; 380/43
[58] Field of Search ........................ 380/37, 42, 43, 380/44, 46, 57, 28, 9, 50; 364/717

[56] References Cited

U.S. PATENT DOCUMENTS

| | | | |
|---|---|---|---|
| 4,078,152 | 3/1978 | Tuckerman, III | 380/37 |
| 4,157,454 | 6/1979 | Becker | 380/37 |
| 4,249,180 | 2/1981 | Eberle et al. | 380/37 |
| 4,255,811 | 3/1981 | Adler | 380/37 |
| 4,724,541 | 2/1988 | Mallick | 380/28 |
| 5,003,597 | 3/1991 | Merkle | 380/37 |
| 5,054,067 | 10/1991 | Moroney et al. | 380/37 |
| 5,214,704 | 5/1993 | Mittenthal | 380/37 |
| 5,351,299 | 9/1994 | Matsuzaki et al. | 380/37 |
| 5,454,039 | 9/1995 | Coppersmith et al. | 380/28 |

OTHER PUBLICATIONS

Ronald L. Rivest, "The RC5 Encryption Algorithm", Dr. Dobb's Journal, Jan. 1995 pp. 146–148.
Applied Cryptography, Protocols, Algorithms, and Source Code in C, Bruce Schneier, pp. 154–185; 219–272.
"A High Performance Encryption Algorithm," W.E. Madryga, Computer Secuirty, pp. 557–570.

*Primary Examiner*—Thomas H. Tarcza
*Assistant Examiner*—Pinchus M. Laufer
*Attorney, Agent, or Firm*—Nixon & Vanderhye P.C.

[57] ABSTRACT

A simple encryption and decryption device has been developed. The underlying algorithm is a fast block cipher that may be implemented efficiently in hardware or software. The algorithm makes heavy use of data-dependent rotations. The amount of each rotation depends on the data being encrypted and intermediate encryption results. The variables for the algorithm include word size, rounds, and the length of a secret key.

16 Claims, 4 Drawing Sheets

ENCRYPTION

ENCRYPTION

DECRYPTION

BLOCK ENCRYPTION ALGORITHM WITH DATA-DEPENDENT ROTATIONS

BACKGROUND AND FIELD OF INVENTION

The present invention relates broadly to cipher methods and devices, and in particular to block-cipher cryptographic methods and devices. The invention also has applicability in other fields, such as that of pseudo-random number generators used in randomized computations. Generally, cryptographic devices are used to encrypt and decrypt data transmitted through communication and transmission systems. Typically, the data is encrypted at the transmitting station utilizing a unique key, and transmitted in its encrypted form. At the receiving station, the encrypted data is passed through a decryption unit supplied with the same unique key such that clear text is output from the decrypt section of the receiver. An example of a conventional block-cipher cryptographic system is the Data Encryption Standard (DES). DES and other block-cipher systems are described in Schneier, *Applied Cryptography*, pp. 154–185 and 219–272, John Wiley & Sons, Inc. (1993). This text in its entirety provides a good general description of cryptography and block-cipher systems.

A novel aspect of the cipher of the present invention is its heavy use of data-dependent rotations and employing intermediate encryption results to determine the amount of each rotation of the data being encrypted. The invention is one of the first to use data dependant rotation for encryption. An example of a prior cipher that employs data-dependent rotations is described in W. E. Madryga "A High Performance Encryption Algorithm" *Computer Security: A Global Challenge*, pp. 557–70 (1994). The Madryga cipher lacks the broad generality and flexibility afforded by the present invention and does not have a so-called "Feistel" (DES-like) structure, as has the present invention. Moreover, doubts have been expressed about the strength of the Madryga algorithm. See Schneier, *Applied Cryptography*, pp. 244–247. Another example of data-dependant rotation in a cipher is described in U.S. Pat. No. 4157,454, entitled "Method And System For Machine Enciphering And Deciphering" which discloses a cipher algorithm having rotation dependent on a key, rather than on the message. These prior examples of data-dependent rotation in a cipher are few and infrequent. Most of the prior art ciphers that have used rotation, do not make the rotation data dependent. Examples of ciphers using rotation that is not data dependent, include FEAL and the ciphers disclosed in U.S. Pat. Nos. 5,351,299 ("Apparatus And Method For Data Encryption With Block Selection Keys And Data Encryption Keys"); 5,045,067 ("Block-Cipher Cryptographic Device Based Upon A Pseudorandom Nonlinear Sequence Generator"); 5,003,597 (Method And Apparatus For Data Encryption) and 4,255,811 ("Key Controlled Block Cipher Cryptographic System").

SUMMARY OF INVENTION

An encryption algorithm has been invented that is a fast, block cipher. A novel feature of the cipher is its heavy use of data-dependent rotations which are an intriguing cryptographic primitive. Data-dependent rotations operate such that one word of intermediate results is cyclically rotated by an amount determined, for example, by some low-order bits of another word of the intermediate results. The data-dependent rotations in the cipher should frustrate differential cryptanalysis and linear cryptanalysis, which are two powerful techniques for cryptanalyzing block ciphers.

The cipher is suitable for implementation in hardware and software. To this end, the cipher invokes primarily computational primitive operations that are commonly found and executed on conventional microprocessors. The cipher is exceptionally simple and short, especially in its encryption/decryption algorithms. The simplicity and brevity of the cipher allows for easy implementation and analysis, as compared to other block ciphers. In a preferred embodiment of the cipher, its algorithms do not resort to operations that are difficult to execute on conventional processors. The cipher is also fast. To achieve its speed, the cipher is word-oriented. The basic computational operations used in the cipher are operations that act on complete words of data, rather than smaller segments of words. Moreover, the cipher requires minimal memory and may be readily implemented on smart cards, and other computing and data processing devices with limited available memory.

The cipher employs parameterized algorithms with several variable parameters. The variable parameters include: word size (w), rounds (r) of data rotations, and secret key length (b). The flexibility afforded by these variable parameters allows the cipher to be tailored to match the word size used in a selected processor, and to suit the security and speed requirements of a particular cryptographic application. The cipher may be adapted to processors of different word-lengths by having the number of bits "w" in a word be a variable parameter of the cipher. For example, the word length of the cipher may be set for the relatively-long word lengths used by 64-bit processors, as those processors become available. The number of rounds "r" is a second variable parameter of the cipher. By properly selecting the number of rounds, the execution speed of the cipher may be balanced with the security requirements for the application of the cipher.

It is another objective of the inventive cipher to have a variable-length cryptographic key. Since the cipher is symmetric, the same secret cryptographic key is used for both encryption and for decryption. By properly selecting the length of the key, the cipher can be tailored to provide the desired level of security that is appropriate for a particular application or other requirement. The key length "b" (in bytes) is the third selectable parameter of the cipher. By selecting a relatively-long key length "b", the resulting cipher application will have a relatively-high degree of security against an exhaustive search of each possible key. Similarly, a short key length is believed to provide a lesser degree of security.

The inventive cipher, its potential applications and implementations, and other objectives of the cryptographic system of the present invention will become more apparent by the following detailed description of the invention. With the inventive cipher, a flexible data encryption system is available that can be tailored to particular applications and meet specific security requirements. In addition, the inventive data encryption system is capable of being processed at high speeds and/or high security for use in open digital communication. Moreover, the invention is applicable to other uses, such as pseudo-random number generation.

BRIEF DESCRIPTION OF DRAWINGS

The objectives, advantages and features of the invention will become more apparent from the following description that includes the accompanying drawings and detailed written description. In the drawings.

DETAILED DESCRIPTION OF DRAWINGS

Figure 1A:
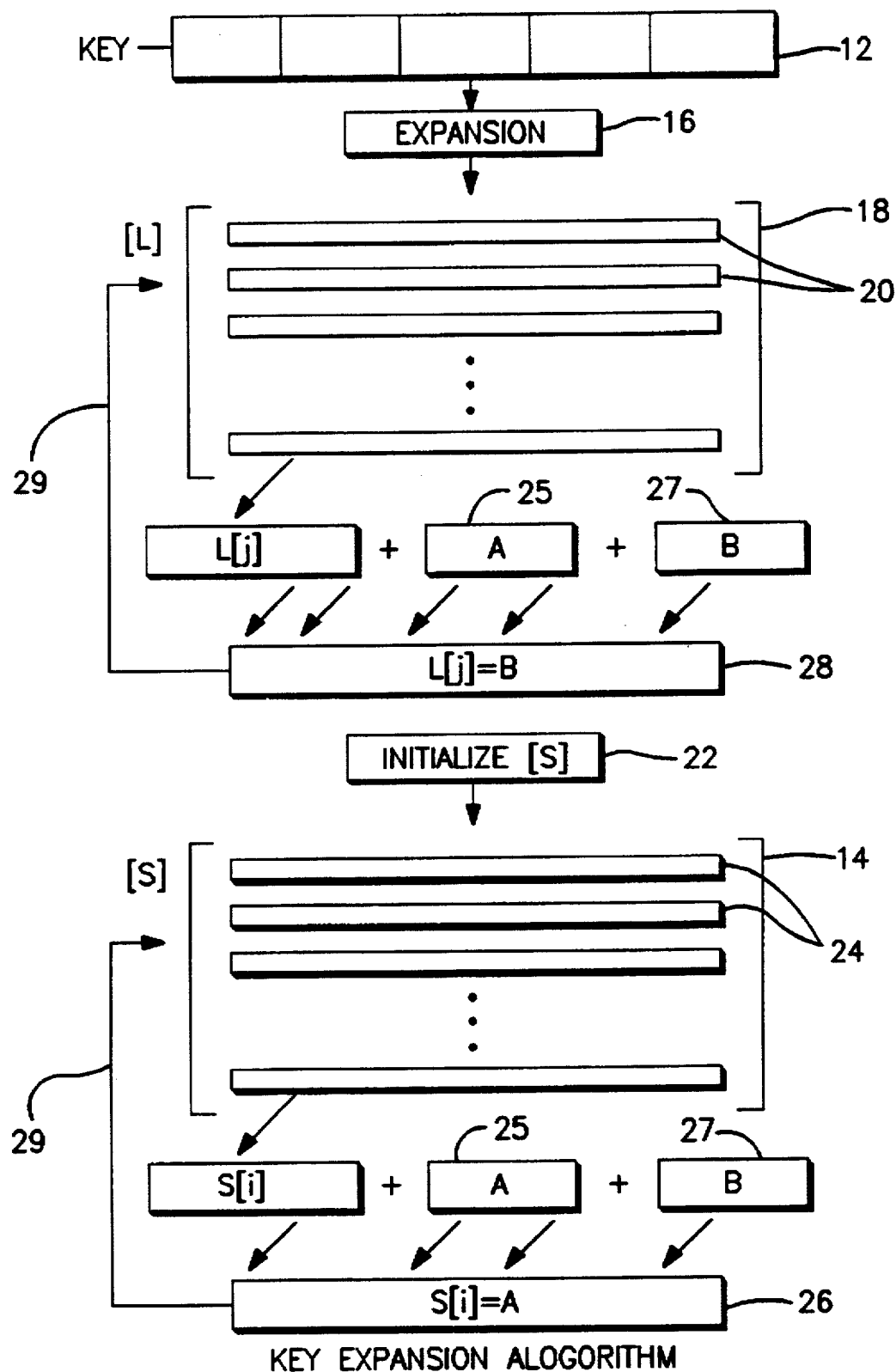
FIGS. 1A, 1B and 1C are a series of flow charts showing a sequence of executable instructions for preforming an exemplary key expansion (FIG. 1A), encryption (Fig. 1B) and decryption (FIG. 1C), all in accordance with an embodiment of the present invention.
Figure 1B:
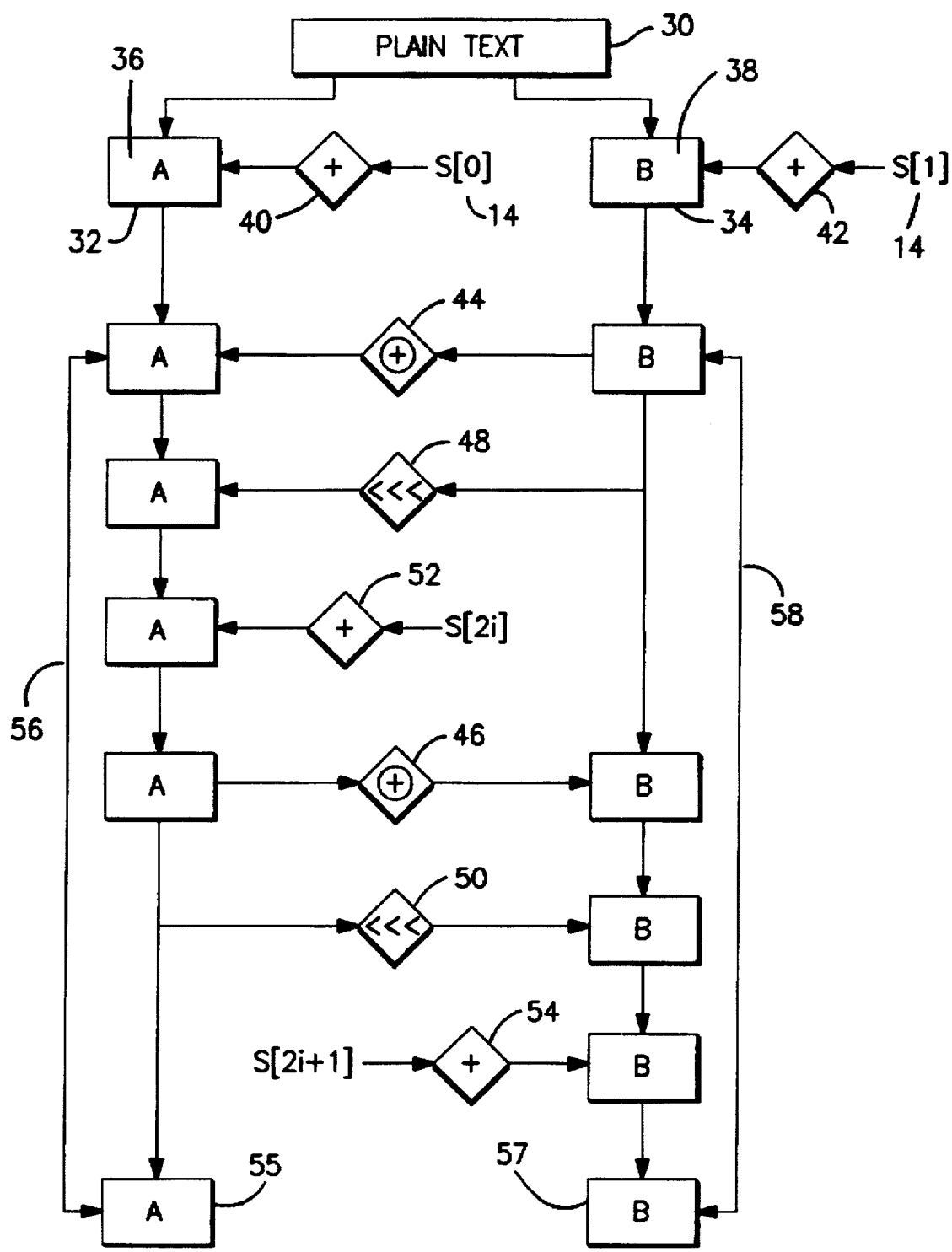
Figure 1C:
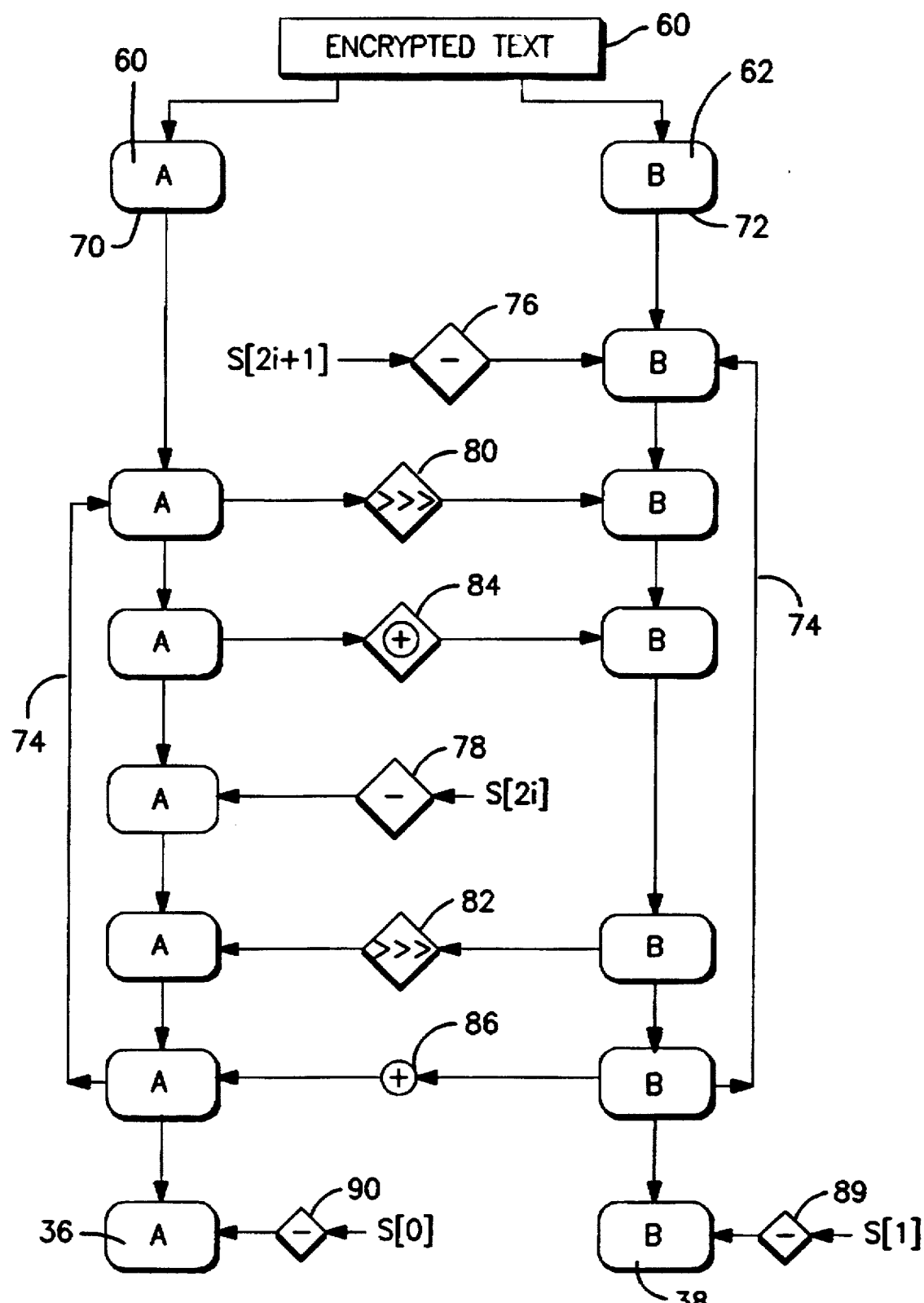

As shown in FIGS. 1A, 1B and 1C, the cipher algorithm in accordance with the present invention consists of three principal components: a key expansion algorithm (FIG. 1A), an encryption algorithm (Fig. 1B), and a decryption algorithm (Fig. 1B). The encryption/decryption routines are simple in their structure and operation. Data-dependent rotations are used in an embodiment of the inventive cipher and are believed to strengthen the cipher's cryptographic strength. Indeed, a novel feature of the cipher algorithm is its heavy use of data-dependent rotations. All the rotation amounts that are performed by the algorithm are dependent on the input data, and this rotation amount is not predetermined. However, the cipher can also be implemented with operations other than only rotation. For instance, substitution can be included in the basic round operations.

The preferred embodiment of the cipher is word oriented in that all of the basic computational operations have (w)-bit words as inputs and outputs. The cipher is a block-cipher with a two-word input (plaintext) block size and a two-word (ciphertext) output block size. A nominal choice for (w) is (32) bits, for which the cipher would have 64-bit plaintext and ciphertext block sizes. The cipher is well-defined for any value of w greater than 0, although for simplicity it may be preferable to allow only selected values for (w) such as 16, 32, and 64.

The number of rounds (r) is a second variable parameter of the algorithm. Choosing a relatively large number of rounds should provide an increased level of security. The cipher employs an "expanded key table" or key schedule, (S), that is derived from the user's supplied secret key. The size (t) of table S also depends on the number (r) of rounds. In particular, S may have $t=2(r+1)$ words. Accordingly, selection of a relatively large number of rounds also implies a need for more memory.

PRIMITIVE OPERATIONS

The term "lg(x)" is used to denote the base-two logarithm of "x". The cipher may be implemented in algorithms that use only the following three primitive operations (and their inverses).

1. Two's complement addition of words, denoted by "+". This is modulo-$2^w$ addition. The inverse operation, subtraction, is denoted by "-".

2. Bit-wise exclusive-OR (XOR) of words, denoted by "⊕".

3. A left-rotation (or "left-spin") of words: the cyclic rotation of word x left by y bits is denoted x<y. Here y is interpreted modulo w, so that when w is a power of two, only the lg (w) (base-two logarithm of w) low-order bits of y are used to determine the rotation amount. The inverse operation, right-rotation, is denoted x>y.

These primitive operations are directly and efficiently supported by most processors.

A novel feature of the cipher is that the rotations are rotations by "variable" (plaintext-dependent) mounts. On modem microprocessors, a variable-rotation x<y is executed in a constant amount of time. Thus, the time required for a rotation is independent of the rotation amount y. Since rotations are the only non-linear operator in this embodiment of the cipher, the strength of the cipher depends on the cryptographic properties of data-dependent rotations.

There is a family of algorithms based on the inventive cipher, where each algorithm is specified by parameters w, r and b. These parameters are summarized as follows:

W This is the word size, in bits; each word (u in bytes) contains u=(w/8) 8-bit bytes. The nominal value of w is 32 bits. Other preferred values of w are 16, 32, and 64. The algorithm encrypts two-word blocks: plaintext and ciphertext blocks are each 2w bits long.

r This is the number of rounds. Also, the expanded key table S contains $t=2(r+1)$ words. The values of r may be 0, 1, . . . , 255.

In addition to w and r, the cipher may have a variable-length secret cryptographic key, specified by parameters b and K:

b The number of bytes in the secret key K. The values of b may be 1,. . ., 255.

K The b-byte secret key: K[0], K[1], . . . , K[b-1]. For notational convenience, a particular (parameterized) algorithm may be designated as "RC5-w/r/b" (where RC5 is a tradename of RSA Laboratories associated with the cipher) to identify its word-length, number of rounds, and number of bytes of the secret key K. For example, a "RC5-32/16/10" cipher has 32-bit words, 16 rounds, a 10-byte (80-bit) secret key variable, and an expanded key table of $2(16+1)=34$ words. Another example of a cipher would be "RC5-32/12/16", which for present purposes is considered as a nominal choice of parameters.

KEY EXPANSION

As shown in FIG. 1A, the key-expansion algorithm 16 expands the user's secret key (K) 12 to fill the expanded key table [S] 14, so that S resembles an array of $t=2(r+1)$ random binary words determined by K. The key-expansion algorithm initializes [S] 14 from the user's given secret key parameter (K) 12. The cipher will use the key table S sequentially, one at a time. This use of S differs from DES that uses an "S-box".

The key expansion algorithm uses two "magic constants," and consists of three simple algorithmic parts. Magic constants ($P_w$ and $Q_w$) are two word-sized binary constants that may be defined for arbitrary w as follows:

$P_w = \text{Odd}((e - 2) 2^w)$ $Q_w = \text{Odd}((\phi - 1) 2^w)$

Where:

e=2.718281828459. . . (base of natural logarithms);

$\phi$=1.618033988749. . . (golden ratio), and

Odd(x) is the odd integer nearest to x (rounded up if x is an even integer, although this will not happen here). For w=16, 32, and 64, these constants are given below in binary and in hexadecimal.

```
P16 = 1011011111100001 = b7e1
Q16 = 1001111000110111 = 9e37
P32 = 10110111111000010101000101100011 = b7e15163
Q32 = 10011110001101110111100110111001 = 9e3779b9
P64 = 1011011111100001010100010110001010001010111011010010101001101011
    = b7e151628aed2a6b
Q64 = 1001111000110111101111001101110010111111101001010011111100000101011
    = 9e3779b97f4a7c15
```

To convert the secret key from bytes to words, the key is first expanded 16. The first step of key expansion is to segment the secret key K[0], K[1], K[2]. . . K[b-1 ] 12 into key blocks, and copying the key blocks into a key table L[0, 1, 2, . . . c-1] 18, of c=[b/u] words, where u=w/8 is the number of bytes/word. This operation is done in a natural manner, using u consecutive key bytes of K to fill up each successive word in L20, low-order byte to high-order byte. Any unfilled byte positions of L are zeroed.

On "little-endian" machines such as an computer with an Intel 486 processor, the above key expansion task can be accomplished by zeroing the table L18, and copying the secret key string K directly into the memory positions representing L of the encryption device. The following pseudo-code achieves the same effect, assuming that all bytes are "unsigned" and that table L is initially zeroed.

For $i = b - 1$ Down To 0 Do:

$$L[i/u] = (L[i/u] <<< 8) + K[i].$$

The second step of key expansion is to initialize 22 pseudo-random table S 14 to a particular fixed (key-independent) pseudo-random bit pattern of table elements S[i]24, such as, for example, using an arithmetic progression modulo $2^w$ determined by the magic constants $P_w$ and $Q_w$. Since $Q_w$ is odd, the arithmetic progression has period $2^w$.

$$S[0] = P_w;$$

For $i = 1$ To $t - 1$ Do:

$$S[i] = S[i - 1] + Q_w.$$

The third step of key expansion is to mix in the user's secret key in three passes over the tables S and L. Due to the potentially different sizes of S and L, the larger table will be processed three times, and the other may be handled more times.

$i=j=0;$ $A=B=0;$ where A 25 and B 27 are memory registers in a processor executing the key expansion instructions.

Do 3 * max($t,c$) times (step 29):

$A = S[i] = (S[i] + A + B) <<< 3;$ (step 26)

$B = L[j] = (L[j] + A + B) <<< (A + B);$ (step 28)

$i = (i + 1) \bmod(t);$ $j = (j + 1) \bmod(c).$

This key-expansion sequence has a certain amount of "one-wayness", so that it is not easy to determine K from S.

ENCRYPTION

As shown in FIG. 1B, the plaintext input block 30 is stored in two w - bit registers A 32 and B 34 where w equals 32 bits . The plaintext input to the encryption algorithm consists of two (w)-bit words 30, which are denoted (A) 36 and (B) 38. An expanded key table, S[0 . . . t-1] 14, consisting of t=2(r+1) (w)-bit words, is stored in memory of the encryption device. Some of the expanded key table S 14 is initially added to the plaintext, and each round of the encryption algorithm ends by adding expanded key from S to the intermediate values just computed. This assures that each round acts in a potentially different manner, in terms of the rotation mounts used. The XOR operations back and forth between (A) and (B) provide some avalanche properties, causing a single-bit change in an input block to cause multiple-bit changes in following rounds.

Standard little-endian conventions may be used to package bytes into input/output blocks: the first byte (a byte may equal 8 bits)occupies the low-order bit positions of register A, and so on, so that the fourth byte occupies the high-order bit positions in A, the fifth byte occupies the low-order bit positions in B, and the eighth (last) byte occupies the high-order bit positions in B.

In this example, the encryption algorithm is presented as a simple five-line algorithm written in pseudo-code as:

$A=A+S$ [0]; (step 40)

$B=B+S$ [1]; (step 42)

For $i = 1$ Tor Do (steps 56, 58)

$A = ((A \oplus B) <<< B) + S[2 * i];$ (steps 44, 48, 52,)

$B = ((B \oplus A) <<< A) + S[2 * i + 1];$ (steps 46, 50, 54,)

The addition and exclusive OR operations of the encryption algorithm are invertible operations, in that there is a one-to-one mapping between the input and output of the operation. The encrypted data output, A(encrypt) 53 and B(encrypt) 57, is stored in memory registers A and B, respectively. Each round of the cipher updates both registers A and B.

Decryption

The decryption routine, which is shown in FIG. 1C, is derived from the encryption routine. The key expansion sequence as shown in FIG. 1A and as executed at the encryption source is also executed at the decryption device in the receiver, using the same secret key K. Accordingly, the receiver has the same key table S stored in memory as did the source. The encrypted information 60, 62 is input to memory registers A 70 and B 72 in the decryption device in the receiver. Having the key table and encrypted information, the source can decode the information in A and B as follows:

For $i = r$ Down To 1; (step 74)

$B = ((B - S[2 * i + 1]) >>> A) \oplus A;$ (steps 76, 80, 84)

-continued $$A = ((A - S[2 * i]) \ggg B) \oplus B; \text{ (steps 78, 82, 86)}$$

$$B = B - S[1]; \text{ (step 88)}$$

$$A = A - S[0]. \text{ (step 90)}$$

Upon completion of the decryption process, the original plaintext 36, 38 is stored in memory registers A, B, ready for output to another memory location or to an output device.

SECURITY AND SPEED OF THE CIPHER

The level of security afforded by the cipher varies from essentially no security to a high degree of security depending on the selection of the parameter values. For example, r=0 provides essentially no encryption, and r=1 is easily broken. Similarly, setting b=0 gives no security. On the other hand, choosing the maximum allowable parameter values would be overkill for most applications. A range of parameter values may be used from which a particular encryption algorithm may be selected having a security and speed that is optimized for a specific encryption application. Moreover, the range also provides for an evolution of algorithms in that the parameters may be adjusted as necessary in the future.

As an example, one might reasonably choose a cipher algorithm in accordance with the current invention that is designated as "RC5-32/16/7" as a replacement the conventional block-cipher Data Encryption Standard (DES). The input/output blocks of the cipher algorithm are 2w=64 bits long, as in DES. The number of rounds is also the same as in DES, although each of the "RC5-32/16/7" round is more like two DES rounds since all data registers are updated in one round, rather than just updating half of the registers as is done in DES. Finally, DES and the "RC5-32/16/7" algorithm each have 56-bit (7-byte) secret keys. Unlike DES, which has no parameterization and hence no flexibility, a cipher in accordance with the present invention may be upgraded as necessary by changing the variable parameters. The above exemplary cipher that is to be a DES replacement may be adjusted to an 80 bit key by moving to "RC5-32/16/10".

As technology improves, especially processor and memory technologies, and as the true strength of the family of algorithms that are encompassed by the present invention becomes better understood through analysis, the criteria for selecting the most appropriate parameter values will become better understood. As an example, the choice of r affects both encryption speed (in that larger the value for r mean that more cycles of data rounds will be performed) and security. For some applications, high speed may be the most critical requirement and the selection of the values for the variable parameters will be to obtain the best security within a given encryption time requirement. Accordingly, the selection of a relatively-small value of r (say r=6) may provide sufficient security, albeit modest, within the given speed constraint. In other applications, such as key management, security is the primary concern, and speed is relatively unimportant. Choosing r=32 rounds might be appropriate for such application.

Preliminary statistical tests showed that for w=32, four rounds were sufficient to get very uniform correlations between individual input and output bits in the cipher, and eight rounds were sufficient to cause each message bit to affect some rotation amount. The number of rounds chosen in practice may be selected to be greater (if not substantially greater) than the number of rounds that have been found to be sufficient for uniform correlations and complete rotation effect.

Similarly, the word size w also affects speed and security. For example, choosing a value of w larger than the register size of the CPU can degrade encryption speed. For example, a word size w=16 may be used by cipher researchers in their studies of a "scaled down" version of the cipher of the present invention. Moreover, as 64-bit processors become common, a 64-bit word size (w=64) for such processors may well be used. It may also be convenient to specify a 64-bit word size (w=64) or larger, if the cipher is to be used as the basis for a hash function, in order to have 128-bit (or larger) input/output blocks. Furthermore, the cipher algorithms that embody the present invention may be used in applications that do not require cryptographic security. For example, one might consider using an algorithm "RC5-32/8/0" (with no secret key) applied to inputs 0, 1, 2, . . . to generate a sequence of pseudo-random numbers to be used in a randomized computation.

Figure 2:
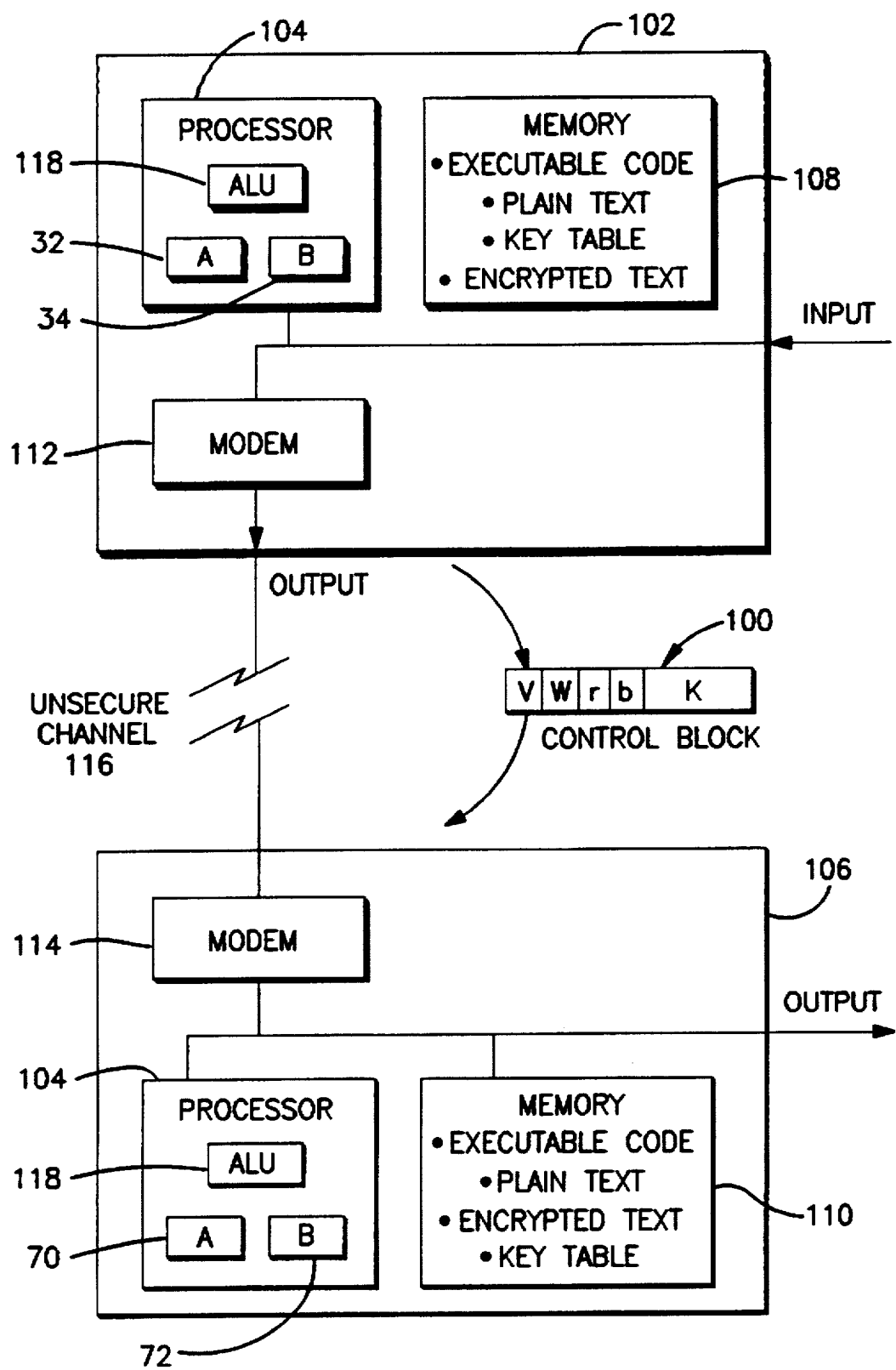
FIG. 2 is a schematic diagram of a communications system for encrypting plaintext information at a source, sending encrypted information over an unsecured channel and decrypting at a receiver the encrypted information to plaintext information using a secret key communicated from the source to the receiver.

The encryption algorithm is very compact, and can be coded efficiently in assembly language on most processors. For example, FIG. 2 shows a schematic of a source terminal 102, e.g., personal computer with Intel 486 processor 104, and a receiver terminal 106, with a similar processor 104. The terminals each include a memory unit 108, 110, to store the key table, executable instructions for the cipher algorithm, and the plaintext and encrypted information. The table S 14 (FIG. 1A) is small and accessed sequentially, minimizing issues of cache size.

In the exemplary implementation shown in FIG. 2, a cipher "RC5-32/12" (32-bit words, 12 rounds) has been set up to encrypt 2.5M bytes/second a 133Mhz DEC Alpha microcomputer with C implementation. The cipher can be implemented efficiently in assembly language so that the rotation operator of the arithmetic logic unit (ALU) 118 of both processors 104 is directly accessible for executing the cipher. For example, an assembly-language routine for the '486 processor can perform each half-round with just four instructions. An initial assembly-language implementation runs at 1.2M bytes/see on a 50 MHz '486 SLC. A Pentium™ should be able to encrypt at several megabytes/second.

The terminals may also include communications units 112, 114, e.g. modems, that are connected to an unsecured communications channel(s) 116, such as a telephone line. This unsecured channel may be used to communicate the control block 100 with the secret key K from the source terminal to the receiver terminal, if the control block is suitably encrypted.

While the present invention has been fully described by way of examples with reference to the accompanying drawings, the invention is not limited to these examples. Persons of ordinary skill in the art may implement the invention in various ways and configurations that embody the subject matter encompassed literally and by equivalents in the following claims.

What is claimed is:

1. A method of communicating information comprising:
    (a) communicating a secret key from the source to the receiver in a manner intended to maintain the secrecy of the key;
    (b) selecting plaintext data at the source to be communicated over the unsecured channel to the receiver;
    (c) encrypting the plaintext data using the key and a block cipher that includes at least two data-dependent rotations to generate encrypted data, wherein the amount of a second of the two data-dependent rotations depends on an encryption result derived from a first of the two data-dependent rotations, wherein the block cipher includes steps of (c.1) segmenting the plaintext data into first and second words, (c.2) rotating the first word by a value derived from the second word, and rotating the second word by a value derived from the first word, and (c.3) repeating step c.2 by a number of rounds;

(d) transmitting the encrypted data over the unsecured channel to the receiver;

(e) decrypting at the receiver the encrypted data using the key and an inverse of the block cipher to generate the plaintext data.

2. A method of communicating information as in claim 1 wherein each word has a predetermined uniform bit length, and the bit length is a selectable variable.

3. A method of communicating information as in claim 2 wherein the bit length of each word is 64 bits.

4. A method of communicating information as in claim 2 wherein the bit length of each word is 32-bits.

5. A method of communicating information as in claim 1 wherein the number of rounds performed in step c.3 is a selectable variable.

6. A method of communicating information as in claim 1 wherein the number of rounds performed in step c.3 is at least four.

7. A method of encrypting information comprising the steps of:

(a) selecting a secret key having a predetermined number of bytes, and (b) encrypting the information using the key and a block cipher that includes data-dependent rotations to generate encrypted data, and wherein the amount of rotation in at least one of the rotations depends on an intermediate result, wherein the block cipher includes steps:

(b.1) segmenting the information, and storing a first part of the information in a first memory register and a second part of the information in a second memory register, (b.2) rotating a first value stored in the first memory register by a value derived from the contents of the second register, and rotating a second value stored in the second register by a value derived from the contents of the first register, (b.3) repeating step b.2 by a number of rounds.

8. A method of encrypting information as in claim 7 wherein the first and second parts of information each have a predetermined uniform bit length, and the bit length is a selectable variable.

9. A method of encrypting information as in claim 8 wherein the bit length of each first and second parts of information is 64 bits.

10. A method of encrypting information as in claim 8 wherein the bit length of each of the first and second parts of information is 32-bits.

11. A method of encrypting information as in claim 7 wherein the number of rounds performed in step c.3 is a selectable variable.

12. A method of encrypting information as in claim 7 wherein the number of rounds performed in step c.3 is at least four.

13. A method of encrypting information comprising:

a. inputting a first block of plaintext information into a first memory register that temporarily stores a first value and a second block of plaintext information into a second memory register that temporarily stores a second value;

b. deriving a key table from a secret key where said key table has a sequence of elements;

c. executing a first invertible operation on the first block of plaintext information stored in the first memory register with a first element of the key table and storing a result of the first invertible operation in the first memory register as the first value, and executing a second invertible operation on the second block of plaintext information stored in the second memory register with a second element of the key table and storing a result of the second invertible operation in the second memory register as the second value;

d. executing a third invertible operation on the first value with the second value from step (c); and storing a result of the third invertible operation in the first memory register as the first value;

e. rotating the bits of the first value from step (d) in the first memory register by a number corresponding to at least a portion of the second value from step (c), and storing a result of the rotation in the first memory register as the first value;

f. executing a fourth invertible operation on the second value from step (c) with the first value from step (e), and storing a result of the fourth invertible operation in the second memory register as the second value;

g. rotating the bits of the second value from step (f) in the second memory register by a number corresponding to at least a portion of the first value from step (e) and storing a result of the rotation in the second memory register as the second value;

h. repeating steps d to g for a predetermined number of rounds, and i. outputting the values in the first and second memory registers as encrypted information.

14. A method as in claim 13 further comprising step:

j. executing a fifth invertible operation on the first value from step (e) stored in the first memory register with a next in the sequence element of the key table and storing a result of the fifth invertible operation in the first memory register as the first value after step e, and executing a sixth invertible operation on the second value from step (g) stored in the second memory register with a next in the sequence element of the key table and storing a result of the sixth invertible operation in the second memory register as the second value after step g.

15. A method as in claim 14 wherein the fifth and sixth invertible operations are two's complement addition operations.

16. A method of encrypting information as in claim 13 wherein the first invertible operation in step c is a two's complement addition operation, the third invertible operation in step d is a bitwise exclusive OR operation, and the fourth invertible operation in step f is another bitwise exclusive OR operation.

* * * * *